(12) United States Patent
Menendez (10) Patent No.: US 7,778,547 B2
(45) Date of Patent: Aug. 17, 2010

(54) CODE GROUPING FOR OPTICAL NETWORKS

(75) Inventor: Ronald Charles Menendez, Chatham, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 759 days.

(21) Appl. No.: 11/444,764

(22) Filed: Jun. 1, 2006

(65) Prior Publication Data

US 2007/0280697 A1 Dec. 6, 2007

(51) Int. Cl.
*H04J 4/00* (2006.01)
*H04J 14/02* (2006.01)
*H04B 10/04* (2006.01)

(52) U.S. Cl. .................. 398/77; 398/79; 398/185

(58) Field of Classification Search ............... 398/77, 398/78, 79, 185, 188, 190; 359/279
See application file for complete search history.

(56) References Cited

U.S. PATENT DOCUMENTS

| 2001/0030788 A1* | 10/2001 | Pfeiffer | 359/136 |
| 2003/0081287 A1* | 5/2003 | Jannson et al. | 359/139 |
| 2004/0033074 A1 | 2/2004 | Hsu | |
| 2004/0218924 A1 | 11/2004 | Fathallah | |
| 2006/0147219 A1* | 7/2006 | Yoshino et al. | 398/183 |

OTHER PUBLICATIONS

Experimental Demonstration Of Bipolar Optical CDMA system Using A Balanced Transmitter And Complementary Spectral Encoding; Lam et al.; Photonics Technology Letters, IEEE; vol. 10, Issue 10, Oct. 1998; pp. 1504-1506.*
International Search Report, dated Apr. 11, 2008 (2 pages).
Khattab, et al.; Cross-layer throughput analysis for optical code labeled GMPLS networks; Broadband Networks, 2005 2nd International Conference on; Oct. 3-7, 2005, vol. 1, pp. 323-326.
Khattab, et al.; Optical GMPLS networks with code switch capable layer for sub-wavelength switching; Global Telecommunications Conference, 2004, GLOBECOM '04, IEEE; vol. 3, Nov. 29 to Dec. 3, 2004, pp. 1786-1792.

* cited by examiner

*Primary Examiner*—Nathan M Curs
(74) *Attorney, Agent, or Firm*—Philip J. Feig (57) ABSTRACT

The invention is directed to code labeling in an optical network. The network includes a transmitting station operable to transmit an optical signal. The network also includes an encoder coupled to the transmitting station operable to label the optical signal composed of a group of codes. A receiving station operable to receive the labeled group of optical codes is also provided. The receiving station is operable to read the optical signal if the label of the received group of codes corresponds to the group of codes assigned to the receiving station.

5 Claims, 9 Drawing Sheets

CODE GROUPING FOR OPTICAL NETWORKS

STATEMENT REGARDING FEDERALLY SPONSORED RESEARCH

Funding for research was partially provided by the Defense Advanced Research Projects Agency under federal contract MDA972-03-C-0078. The federal government has certain rights in this invention.

FIELD OF THE INVENTION

The present invention relates to optical communication and, more particularly, to routing of groups of spectrally phase encoded optical code division multiple access (OCDMA) signals.

BACKGROUND OF THE INVENTION

Various communications schemes have been used to increase data throughput and to decrease data error rates as well as to generally improve the performance of communications channels. As an example, frequency division multiple access ("FDMA") employs multiple data streams that are assigned to specific channels disposed at different frequencies of the transmission band. Alternatively, time division multiple access ("TDMA") uses multiple data streams that are assigned to different timeslots in a single frequency of the transmission band. FDMA and TDMA are quite limited in the number of users and/or the data rates that can be supported for a given transmission band.

In many communication architectures, code division multiple access (CDMA) has supplanted FDMA and TDMA. CDMA is a form of spread spectrum communications that enables multiple data streams or channels to share a single transmission band at the same time. The CDMA format is akin to a cocktail party in which multiple pairs of people are conversing with one another at the same time in the same room. Ordinarily, it is very difficult for one party in a conversation to hear the other party if many conversations occur simultaneously. For example, if one pair of speakers is excessively loud, their conversation will drown out the other conversations. Moreover, when different pairs of people are speaking in the same language, the dialogue from one conversation may bleed into other conversations of the same language, causing miscommunication. In general, the cumulative background noise from all the other conversations makes it harder for one party to hear the other party speaking. It is therefore desirable to find a way for everyone to communicate at the same time so that the conversation between each pair, i.e., their "signal", is clear while the "noise" from the conversations between the other pairs is minimized.

The CDMA multiplexing approach is well known and is explained in detail, e.g., in the text "CDMA: Principles of Spread Spectrum Communication," by Andrew Viterbi, published in 1995 by Addison-Wesley. Basically, in CDMA, the bandwidth of the data to be transmitted (user data) is much less than the bandwidth of the transmission band. Unique "pseudonoise" keys are assigned to each channel in a CDMA transmission band. The pseudonoise keys are selected to mimic Gaussian noise (e.g., "white noise") and are also chosen to be maximal length sequences in order to reduce interference from other users/channels. One pseudonoise key is used to modulate the user data for a given channel. This modulation is equivalent to assigning a different language to each pair of speakers at a party.

During modulation, the user data is "spread" across the bandwidth of the CDMA band. That is, all of the channels are transmitted at the same time in the same frequency band. This is equivalent to all of the pairs of partygoers speaking at the same time and in the same frequency band. The introduction of noise and interference from other users during transmission is inevitable (collectively referred to as "noise"). Due to the nature of the pseudonoise key, the noise is greatly reduced during demodulation relative to the user's signal because when a receiver demodulates a selected channel, the data in that channel is "despread" while the noise is not "despread." Thus, the data is returned to approximately the size of its original bandwidth, while the noise remains spread over the much larger transmission band. The power control for each user can also help to reduce noise from other users. Power control is equivalent to lowering the volume of a loud pair of partygoers.

CDMA has been used commercially in wireless telephone ("cellular") and in other communications systems. Such cellular systems typically operate at between 800 MHz and 2 GHz, though the individual frequency bands may only be a few MHz wide. An attractive feature of cellular CDMA is the absence of any hard limit to the number of users in a given bandwidth, unlike FDMA and TDMA. The increased number of users in the transmission band merely increases the noise to contend with. However, as a practical matter, there is some threshold at which the "signal-to-noise" ratio becomes unacceptable. This signal-to-noise threshold places real constraints in commercial systems on the number of paying customers and/or data rates that can be supported.

CDMA has also been used in optical communications networks. Such optical CDMA (OCDMA) networks generally employ the same general principles as cellular CDMA. However, unlike cellular CDMA, optical CDMA signals are delivered over an optical network. As an example, a plurality of subscriber stations may be interconnected by a central hub with each subscriber station being connected to the hub by a respective bidirectional optical fiber link. Each subscriber station has a transmitter capable of transmitting optical signals, and each station also has a receiver capable of receiving transmitted signals from all of the various transmitters in the network. The optical hub receives optical signals over optical fiber links from each of the transmitters and transmits optical signals over optical fiber links to all of the receivers. An optical pulse is transmitted to a selected one of a plurality of potential receiving stations by coding the pulse in a manner such that it is detectable by the selected receiving station but not by the other receiving stations. Such coding may be accomplished by dividing each pulse into a plurality of intervals known as "chips". Each chip may have the logic value "1", as indicated by relatively large radiation intensity, or may have the logic value "0", as indicated by a relatively small radiation intensity. The chips comprising each pulse are coded with a particular pattern of logic "1"'s and logic "0"'s that is characteristic to the receiving station or stations that are intended to detect the transmission. Each receiving station is provided with optical receiving equipment capable of regenerating an optical pulse when it receives a pattern of chips coded in accordance with its own unique sequence but cannot regenerate the pulse if the pulse is coded with a different sequence or code.

Alternatively, the optical network utilizes CDMA that is based on optical frequency domain coding and decoding of ultra-short optical pulses. Each of the transmitters includes an optical source for generating the ultra-short optical pulses. The pulses comprise Fourier components whose phases are coherently related to one another. Each Fourier component is generally referred to as a frequency bin. A "signature" is impressed upon the optical pulses by independently phase shifting the individual Fourier components comprising a given pulse in accordance with a particular code whereby the Fourier components comprising the pulse are each phase shifted a different amount in accordance with the particular code. The encoded pulse is then broadcast to all of or a plurality of the receiving systems in the network. Each receiving system is identified by a unique signature template and detects only the pulses provided with a signature that matches the particular receiving system's template.

Recently, there has been a renewed interest in OCDMA due to its potential for offering increased levels of security at ultra-high data rates as well as simplifying key networking functions such as passive all-optical code translation (CT), routing based on code assignment, and physical layer code scrambling.

Figure 1A:
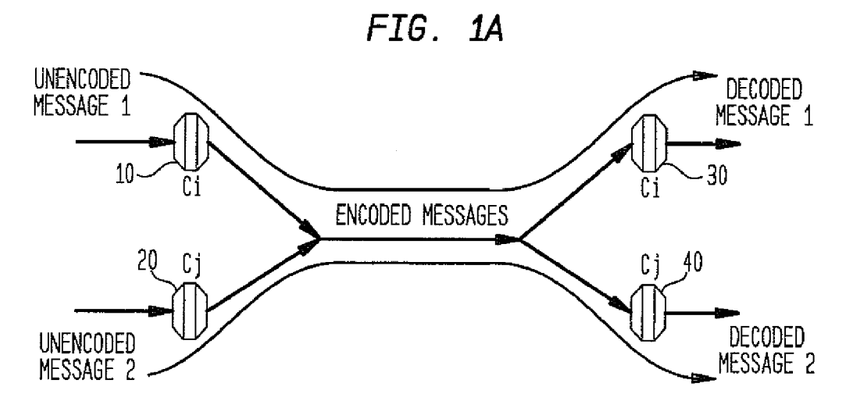
FIG. 1A illustratively depicts a conventional OCDMA configuration, while FIG. 1B illustratively depicts an OCDMA configuration with an intermediate code translation encoder.

Although OCDMA operates at the physical layer in many ways, the most common form of OCDMA network operates in a broadcast-and-select configuration in which communication is established between matching encoders and decoders as shown in FIG. 1A. Signals from encoders 10 and 20 are broadcast to decoders 30 and 40 respectively and the desired signal is discriminated from the other users (interferers) on the basis of their differing code signatures.

To establish arbitrary connectivity amongst all users, the encoders and/or decoders at the edges of the network must be tunable. However, since these networks operate in a broadcast-and-select mode, tunable decoders make eavesdropping on a given transmission relatively easy. At the same time, tunable encoders with fixed decoders obviate simple multicast operation and make it possible for two transmitters to attempt to send to the same decoder simultaneously, thus resulting in code collision and data loss.

Figure 1B:
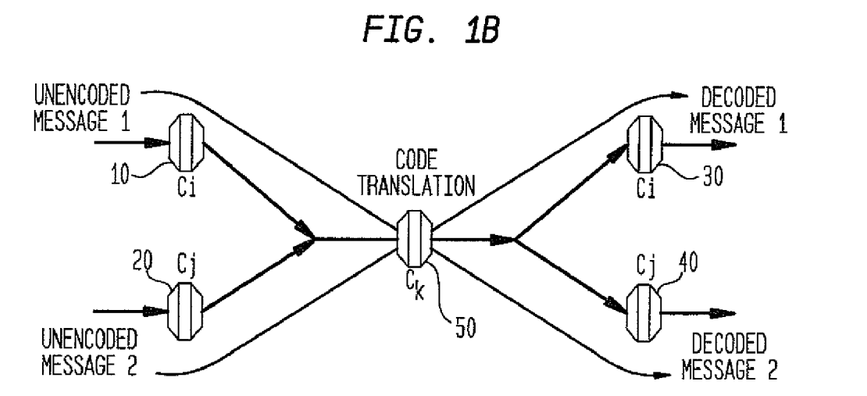

The addition of an appropriate CT stage at the midpoint of a conventional OCDMA network can passively route communication between mismatched encoders and decoders as shown in FIG. 1B. As shown in FIG. 1B a fixed coder 50 is provided at the CT stage. In a sense, CT can be viewed as analogous to wavelength translation in a WDM-based network with the key difference that CT can be accomplished with a passive encoding device while wavelength translations are active in nature. Strictly speaking, the CT stage converts the desired code to the code format required at the receiver but it does not block the second code from arriving at that receiver; instead the second code is converted into another code mismatched to that receiver.

Previously, CT and routing of OCDMA signals focused on dealing with one code at a time. As such, there is a need to assign and label groups using codes such that these groups can be passive routed as a composite entity on the basis of these labels.

SUMMARY OF THE INVENTION

In an aspect of the invention, an optical network is provided. The optical network includes a transmitting station operable to transmit a group of optical encoded signals, an encoder coupled to the transmitting station operable to label the group of optical signals with a group-specific code, and a receiving station operable to receive the group of optical signals labeled with the group label, the receiving station is operable to read the optical signal if the code used to label the group of optical signals correspond to the transmitting station.

In another aspect of the invention, the optical network may also includes a variable coder coupled in between the transmitting and the receiving stations, the variable coder is operable to re-label the incoming optical signal with a new group of codes corresponding to the receiving station.

In yet another aspect of the invention, the set of codes used to label the group of optical signals are Walsh-Hadamard codes.

In yet another aspect of the invention, the variable coder further comprises a plurality of Walsh-Hadamard coders.

In yet another aspect of the invention, the variable coder includes a plurality of switches, and at least one Walsh encoder coupled between a first switch and second switch of the plurality of switches, the first switch being operable to selectively route an optical signal to the Walsh encoder to apply a Hadamard sequence to the optical signal.

In yet another aspect of the invention, each switch among the plurality of switches a 2×2 crossbar switch.

In yet another aspect of the invention, the variable coder further includes a third switch.

In yet another aspect of the invention, the variable coder further includes at least one Walsh encoder coupled between the second switch and the third switch.

BRIEF DESCRIPTION OF THE DRAWINGS

A more complete appreciation of the subject matter of the present invention and the various advantages thereof can be realized by reference to the following detailed description in which reference is made to the accompanying drawings wherein like reference numbers or characters refer to similar elements.

DETAILED DESCRIPTION OF THE INVENTION

Figure 2:
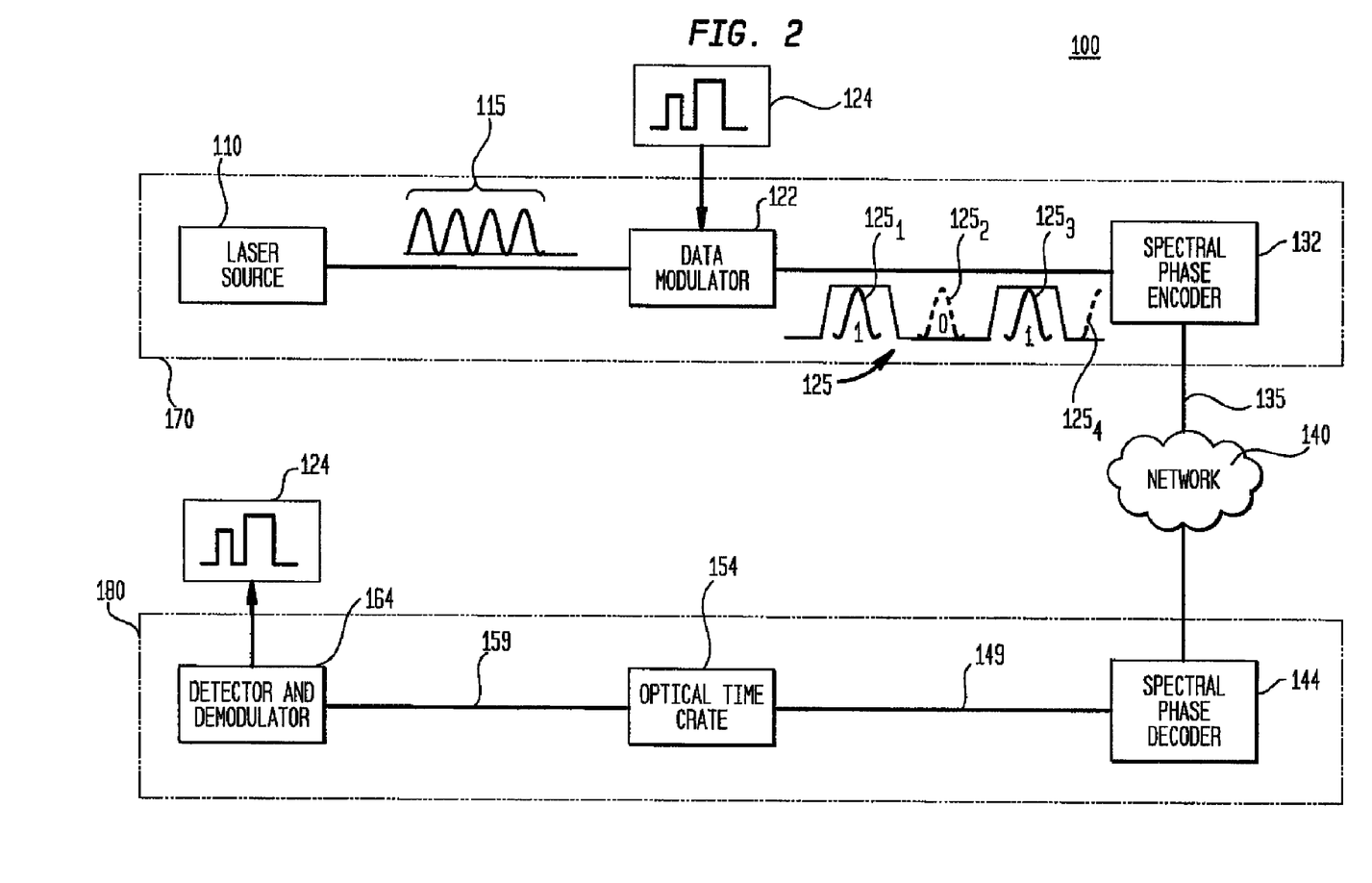
FIG. 2 illustratively depicts a system in accordance with an aspect of the present invention.

FIG. 2 illustratively depicts a system 100 in accordance with an aspect of the present invention. The system comprises a laser source 110 that generates a sequence of optical pulses 115 that are fed to a data modulator 120. The data modulator 122 also receives a data stream 122 that is used to modulate the sequence of optical pulses 115. The modulation data preferably comprises a digital data stream generated by a subscriber or user station 124. In a preferred embodiment, the data modulator 122 comprises an ON/OFF keyed data modulator wherein a "1" symbol or bit in the digital data stream corresponds to the presence of an optical pulse and a "0" symbol or bit corresponds to the absence of an optical pulse. In this way, each pulse represents a bit of information. For example, a modulated stream 125 is shown where the digital data stream comprises a "1010" data sequence. As shown, each time slot with the bit "1" will result in the presence of an optical pulse (125$_1$ and 125$_3$), whereas each time slot with a "0" bit indicates the absence of an optical pulse (125$_2$ and 125$_4$), which are shown as dashed lines to indicate their absence.

The modulated data stream 125 is then fed to a spectral phase encoder 132. As is discussed in further detail below, the spectral phase encoder 132 applies a phase code associated with a user to each optical pulse in the data stream to produce an encoded data stream 135. The phase code operates to provide a "lock" so that only a corresponding phase decoder with the appropriate "key" or phase conjugate of the phase code of the spectral phase encoder may unlock the encoded data stream. Typically, a spectral phase encoder is associated with a particular user and therefore allows only another user with the appropriate key to decode or receive information from the particular user. The information appears as noise to users that do not have the appropriate key.

The encoded data stream 135 may then be synchronously combined with other differently encoded data streams and transported over a network 140, such as Wavelength Division Multiplex (WDM) network for example, to a spectral phase decoder 144 that, preferably, applies the phase conjugate of the phase code of the spectral phase encoder 132, as discussed above. The spectral phase decoder 144 provides a decoded data stream 149 to an optical time gate 150. The spectral phase decoder works in a manner similar to that of the spectral phase encoder as will be described below. The optical time gate 154 operates to reduce multiple access interference by temporally extracting only a desired user channel from among the decoded stream. The optical time gate 154 produces a user data stream 159, which is fed to a data demodulator 164. Where ON/OFF keying was employed at the transmitting end, the data demodulator 164 comprises an amplitude detector that reproduces the digital data stream 124.

In accordance with an aspect of the present invention, the laser source 110, data modulator 122 and spectral phase encoder 132 may comprise a transmitting station 170 associated with a user. The spectral phase decoder 144, optical time gate 154 and demodulator 164 may preferably comprise a receiving station 180 associated with a user.

The spectral phase encoder may utilize a set of Hadamard codes, which are orthogonal and binary, by breaking each Hadamard code into groups of codes. As an example, any of the Hadamard codes can be broken down into a particular multiplicative sequence of Walsh codes. An example of a multiplicative series of codes that span the set of Hadamard code is the set of Walsh codes. Note that the Walsh codes form a proper subset of the Hadamard codes. It should be noted that many (but not all) other sub-groups of size $\log_2(N)$ selected from the Hadamard codes also form a multiplicative basis that can span the complete set of Hadamard codes in sense of the equation in [0048] below. Any of these spanning groups can be used as the basis for the variable Hadamard coder and we focus here on the Walsh subset for specificity.

Because Hadamard codes are truly orthogonal, the system can achieve relatively high spectral efficiency with minimal multi-user interference (MUI). This coding scheme offers orthogonally in the sense that MUI is zero at the time that the decoded signal is maximum. The number of orthogonal codes is equal to the number of frequency bins; hence, relatively high spectral efficiency is possible. Binary Hadamard codes are converted to phase codes by assigning to +1's and −1's phase shifts of 0 and π, respectively. To encode data, which contains a spread of frequencies, as opposed to the unmodulated pulse stream, which contains only the initial comb of frequencies produced by a mode locked laser (MLL), it is preferable to define frequency bins around the center frequencies. Encoding data then consists of applying the phase shift associated with a frequency to the entire bin. The output of the phase encoder is then a signal obtained by summing the phase-shifted frequency components of the modulated signal, or equivalently, by convolving the modulated optical signal at the input of the phase encoder with the inverse Fourier transform of the phase code. Breaking down the Hadamard code into a group of codes allows for the development of an encoder/decoder that can be implemented in relatively small time scales as discussed below.

Figure 3:
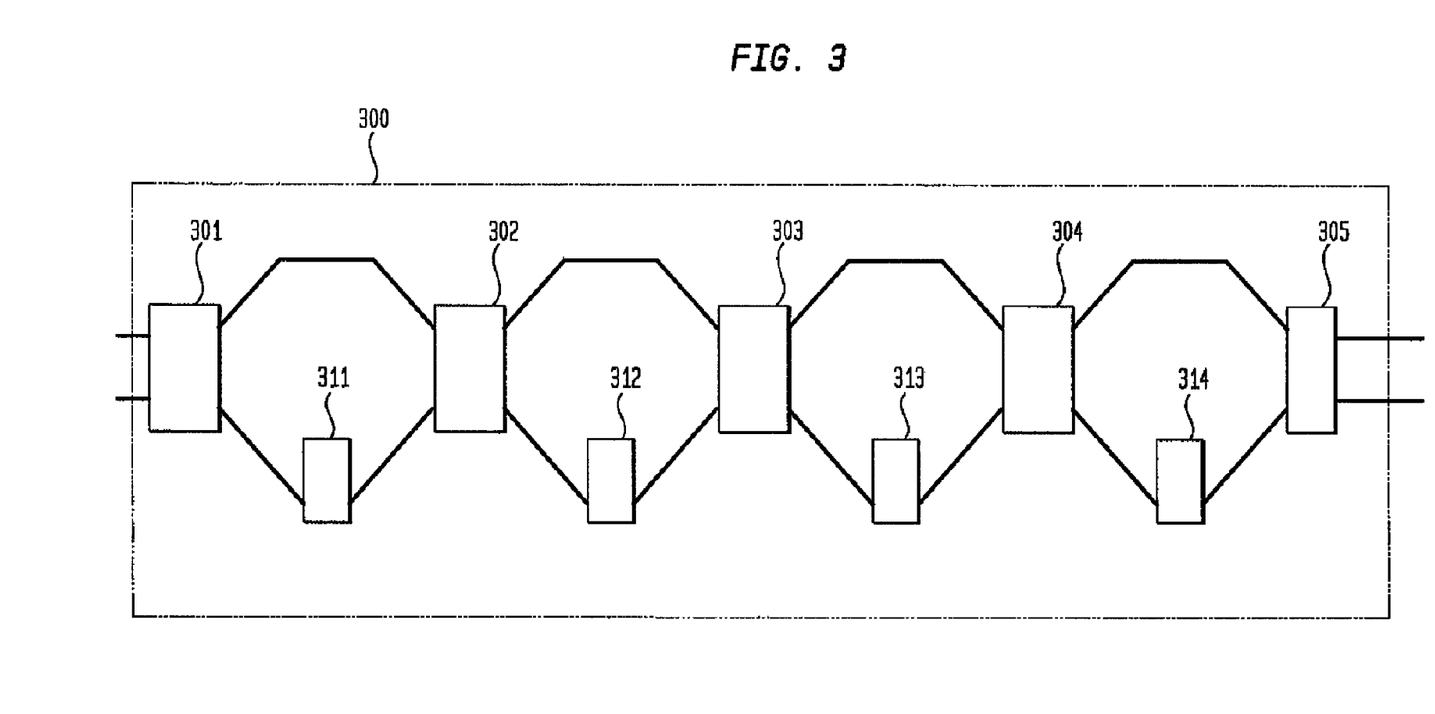
FIG. 3 illustratively depicts a cascaded Hadamard spectral phase encoder/decoder in accordance with an aspect of the present invention.

In an aspect of the present invention the spectral phase encoder is implemented as a dynamic coder that is desirably reconfigurable at the microsecond to nanosecond time scales. In addition, the number of adjustable elements required to span a code space of N codes grows as $\log_2(N)$ rather than as N. The adjustable elements in such coder are not based on λ-scale adjustments of the phase mask, but instead function as optical 2×2 switches arranged in a cascade with fixed Walsh coders. FIG. 3 shows an example of such an encoder. As shown in FIG. 3, encoder 300 includes a cascade of switches 301, 302, 303, and 304 and Walsh coders 311, 312, 313, and 314. Each switch is a 2×2 optical crossbar switch that routes or directs a signal into one or more of the Walsh coders to encode a signal with a particular Hadamard code. Switch 301 can be set so that an incoming signal can bypass Walsh coder 311 or pass through Walsh coder 311. Switch 302 can be set so that an incoming signal can bypass Walsh coder 312 or pass through Walsh coder 312. Switch 303 can be set so that an incoming signal can bypass Walsh coder 313 or pass through Walsh coder 313. Switch 304 can be set so that an incoming signal can bypass Walsh coder 314 or pass through Walsh coder 314. As such, switches 301, 302, 303, and 304 are used to direct the signal to either bypass their respective Walsh coders or to pass through their respective Walsh coders thereby applying a Hadamard code to the signal.

Although optical switching is usually fast enough to operate on the time scale of bits or perhaps packets and with a significant reduction in the number of adjustable elements, the encoder 300 if FIG. 3 could simplify the task of using bit-by-bit code state changes to perform data modulation.

The spectral phase encoder 300 generally works under the principle that Hadamard codes of order N, $H_n$, where n ∈ 1 . . . N, can be decomposed into products of a smaller basis set of Walsh codes $W_m$ of length N where the maximum number of Walsh codes required to reconstruct any of these Hadamard code is $\log_2(N)$. Walsh codes exist for only certain values of m, specifically for $m=2^{P-1}$ where p ∈ 1 . . . $\log_2(N)$ and m=0.

The Walsh codes, like the Hadamard codes, are of length N and all the elements are either +1 or −1. In general, the $n^{th}$ code $W_n$ of length N is characterized by alternating blocks of +1's and −1's where the length of the blocks is given by n. Thus for order N=16, the Walsh codes are as discussed below.

$W_8$ consisting of eight +1's followed by eight −1's (+ + + + + + + + − − − − − − − −).

$W_4$ consisting of two sets of four +1's and four −1's. (+ + + + − − − − + + + + − − − −).

$W_2$ consisting of four sets of two +1's and two −1's. (+ + − − + + − − + + − − + + − −).

$W_1$ consisting of eight sets of +1's and −1's. (+ − + − + − + − + − + − + − + −).

$W_0$ consisting of all 1's (+ + + + + + + + + + + + + + + +).

In general, the $i^{th}$ element of Hadamard code n of order N as the following product of the $i^{th}$ elements of the Walsh codes, also of order N can be written as:

$$H_{n,i} = W_{0,i} \prod_{j=1}^{\log_2(N)} (W_{2^{j-1},i})^{b_j},$$

where $b_j$ is $j^{th}$ digit of the binary representation of (n-1). As a specific example, any of the 16 codes available in $H_{16}$ can be expressed as a product of $W_1$, $W_2$, $W_4$, and $W_8$ (which may correspond to Walsh coders 314, 313, 312, and 311 respectively). The 16 Hadamard codes of order 16 can be represented as:

| | | | |
|---|---|---|---|
| $H_1 = W_0$ | $H_2 = W_1$ | $H_3 = W_2$ | $H_4 = W_2 * W_1$ |
| $H_5 = W_4$ | $H_6 = W_4 * W_1$ | $H_7 = W_4 * W_2$ | $H_8 = W_4 * W_2 * W_1$ |
| $H_9 = W_8$ | $H_{10} = W_8 * W_1$ | $H_{11} = W_8 * W_2$ | $H_{12} = W_8 * W_2 * W_1$ |
| $H_{13} = W_8 * W_4$ | $H_{14} = W_8 * W_4 * W_1$ | $H_{15} = W_8 * W_4 * W_2$ | $H_{16} = W_8 * W_4 * W_2 * W_1$ |

The sum of the Walsh indices equals one less than the corresponding Hadamard code index. Thus the settings for the 2×2 switches (i.e., cross or bar state) to set the coder to Hadamard code n are obtained by converting (n−1) to a binary number. For example, as shown in FIG. 2, if n=14, (n−1)=13=(1 1 0 1)$_{base\ 2}$ and the switches 301 and 302 would be set such that the signal passes through Walsh coders 311 and 312. Switch 303 would be set so that the signal bypasses Walsh coder 313 and switch 304 would be set so that signal passes through Walsh coder 314.

Figure 4:
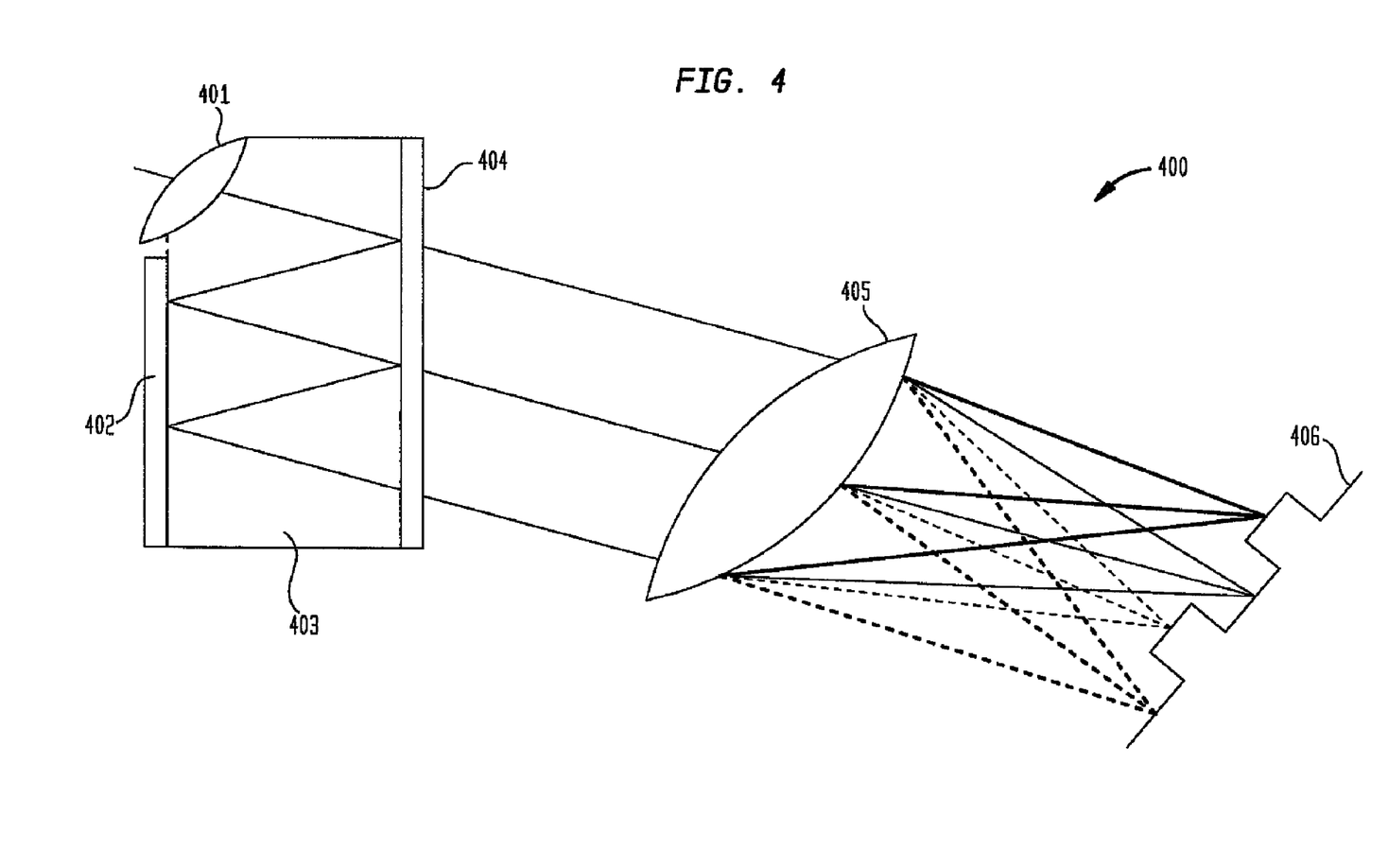
FIG. 4 illustratively depicts a Walsh encoder in accordance with an aspect of the invention.
Figure 5A:
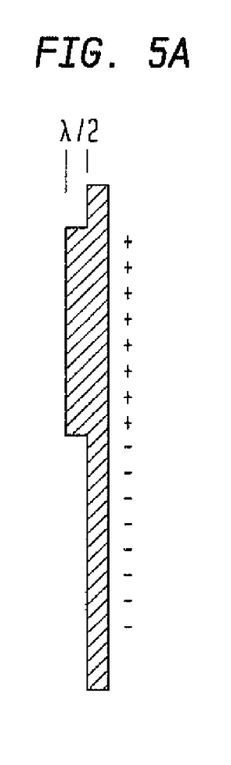
FIGS. 5A through 5D illustratively depict reflective phase masks in accordance with an aspect of the invention.
Figure 5B:
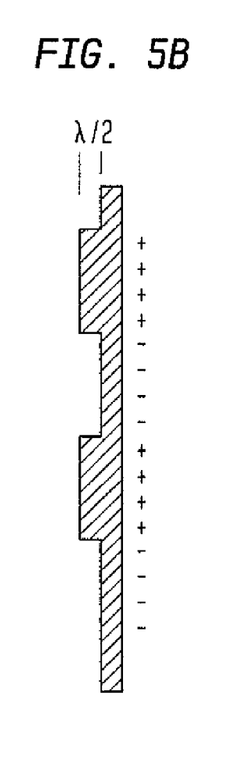
Figure 5C:
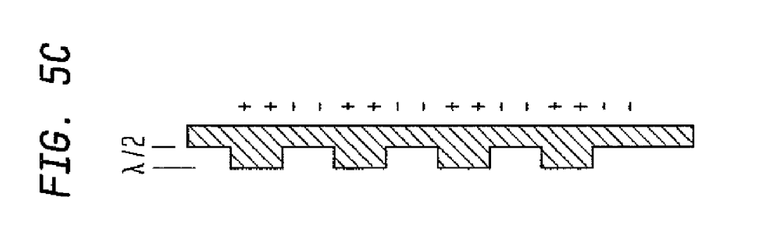
Figure 5D:
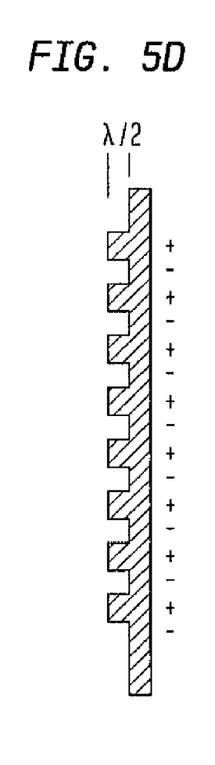

FIG. 4 shows an example of a spectral phase coder 400, for example, a Walsh coder, in accordance with an aspect of the invention. As shown in FIG. 4, an optical signal enters a collimated lens 401. The optical signal passes through space 403 toward a gradient reflective coating 404. Space 403 may be an air gap or it may be filled with a glass substrate. Gradient reflective coating 404 such as silver or aluminum which is highly-reflective/low-transmissive near the collimating lens (where the light is bright) and tapers off to low-reflectance/high-transmittance further from the lens to allow a portion of the optical signal to pass through and reflects the other portion through space 403 toward a 100% reflective material. The portion(s) of the optical signal that pass through coating 404 are directed toward a Fourier lens 405. Fourier lens 405 converts the incoming signal into the frequency domain and directs the converted signal onto a reflective phase mask 406 as shown in FIG. 4. Reflective phase mask 406 corresponds to the respective Walsh code. FIG. 4 is an example of one method for implementing a spectral phase encoder. Other spectral phase encoders may be implemented, for example, on a semiconductor chip Reflective phase mask is different for each Walsh coder. For instance, as shown in FIG. 5A, for Walsh coder $W_8$, the phase mask would be set at a height $\lambda/2$ for 8 bits and then changed back to the base level. As shown in FIG. 5B, for Walsh coder $W_4$, the phase mask would be set at height $\lambda/2$ for 4 bits and then changed back to the base level for 4 bits. This pattern is then repeated one more time. As shown in FIG. 5C, for Walsh coder $W_2$, the phase mask would be set at height $\lambda/2$ for 2 bits and then changed back to the base level for 2 bits. This pattern is then repeated three more times. As shown in FIG. 5D, for Walsh coder $W_1$, the phase mask would alternate in between height $\lambda/2$ and the base height for a total length of 16 bits.

Physically, any given Walsh function can be implemented by phase coders of the type contemplated for standard Hadamard codes and the successive products of the Walsh codes correspond to passing through the corresponding Walsh coders in cascade (in any order). Although FIG. 3 shows Walsh coders W8, W4, W2, and W1 (311, 312, 313, and 314 respectively) in that particular order, that order may be changed to any combination such as W8, W1, W4, and W2 for example.

All of the N codes of Hadamard N can be reproduced in a cascaded structure of $\log_2(N)$ fixed Walsh coders interspersed with $\log_2(N)$ 2×2 optical crossbar switches as shown in FIG. 3 for the case N=16. The switches route the signal through the following stage in the Walsh cascade or cause the signal to bypass that stage. Each of the 16 possible states of the 4 switches corresponds to one of the 16 Hadamard codes. For example, if all four switches are in the "bar" state, the input signal bypasses all four Walsh coders 311, 312, 313, and 314, emerges unchanged, and the cascade is equivalent to $H_1$. If all four switches are in the "cross state" the signal passes through Walsh coder 311, bypasses Walsh coder 312, passes through Walsh coder 313, and bypasses Walsh coder 314. The net effect is equivalent to $W_8*W_2=H_{11}$.

At the rightmost edge of the cascade, element 305 may be a passive coupler (which introduces an additional 3 dB loss) or an additional crossbar switch which may reduce the signal loss by connecting the output port to the active branch of the previous state; in short, the state of the rightmost switch (element 305) would match the state of the switch 304.

Figure 6:
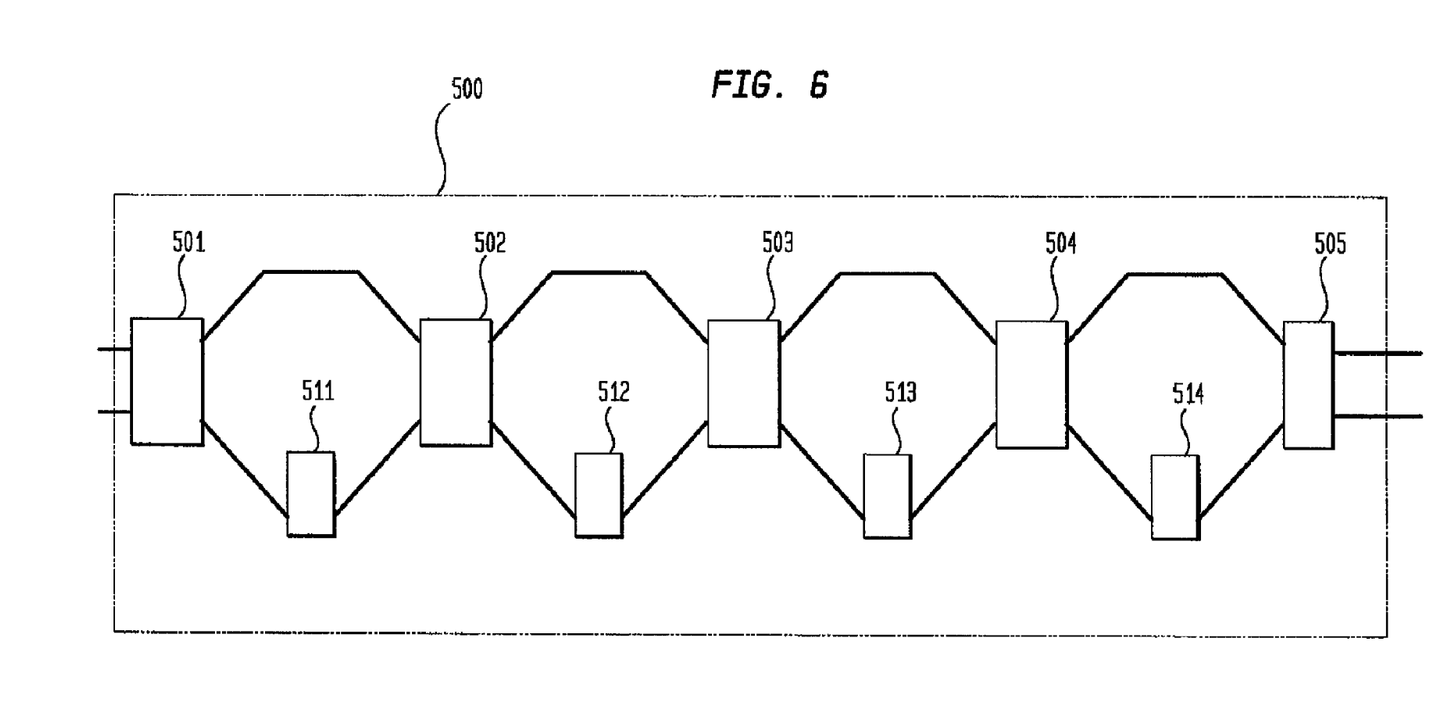
FIG. 6 illustratively depicts a cascaded Hadamard spectral phase decoder in accordance with an aspect of the invention.

If this final crossbar switch is included, the configuration above could serve as a dual-code coder by using both of the inputs on the left and both of the outputs on the right. Consider a situation where all of the crossbar switches are set such that the uppermost bypass branch is selected. In this case, signals entering the upper input port emerge from the upper output port after having code $H_1=W_0$ applied to them (unchanged). For that same configuration of the cascade, signals entering the lower input port will be guided through all four Walsh coders and emerge at the lower output port after having code $H_{16}=W_8*W_4*W_2*W_1$ applied to them (note, this signal could also counter-propagate through the cascade). In general, when the cascade is set to code Hadamard code m on the upper branch, it is simultaneously set to code Hadamard code (N−m+1) on the lower branch. This implies that Hadamard codes m and (N−m+1) are complementary codes in the sense that their binary representations in Walsh projection are bit-wise inverted. Consider a scenario in which a user is assigned two such complementary codes A and B to use to represent 1 or 0 (code-shift keying/modulation). Using a rapidly tunable variable coder, this user launches a continuous sequence of A or B coded pulses to convey his data. (The use of two codes provides greater signal obscurity.) At the receiver end, a variable decoder cascade, for example, as shown in FIG. 6, would be set to the A/B complement. If the received signal is split and launched into both input ports, the cascade will operate such that the A pulses are decoded at one output port and the B pulses are decoded at the other output port in a natural setup for differential detection of a code-shift-keyed transmission.

The different paths through the spectral phase encoder 300 may, for different Hadamard codes, cause the signals to incur different losses and different levels of bin edge filtering effects. Although not shown, encoder 300 may include mediation measures such as in-line amplifiers at each stage, lumped losses in the bypass legs or a single gain-clamped amplifier to compensate for the loss variations.

For full generality $\log_2(N)$ Walsh coders are needed, but for some subsets of the Hadamard codes, the cascade depth might be reduced. For example, if the variable coder need only provide access to odd-numbered Hadamard codes, the $W_1$ stage of the cascade could be eliminated. If the variable coder need only provide access to even-numbered Hadamard codes, the $W_1$ stage of the cascade need not be switched. If the variable coder need only provide access to Hadamard codes for $n<9$, the $W_8$ stage of the cascade could be eliminated.

Finally, this approach is not limited to the standard real-valued (+1, −1) codes. There exists at least one variety of complex generalizations of the Hadamard code that can be implemented via augmenting the cascade. These generalize Hadamard codes $G_N$ retain the desired orthogonality property of Hadamard codes and are obtained by pre-multiplying and/or post-multiplying the Hadamard matrix by monomial matrices with complex elements according to $G_N = M1_N * H_N * M2_N$. If the monomial matrices $M1_N$ and $M2_N$ are diagonal, they can each be physically realized by a fixed complex phase coder (i.e., with a complex phase mask). If these coders precede the cascade and follow the cascade (in appropriate sequence), the N different $G_N$ codes can be accessed by the same $\log_2(N)$ switching elements as above.

Although the above description describes how a spectral phase encoder 300 works, the same principles apply for a spectral phase decoder 500 illustrated in FIG. 6. An incoming encoded data stream 135 from network 140 is applied to the spectral phase decoder 500. When using Walsh codes, the spectral phase decoder 500 or 144 applies the same Walsh coders used in the spectral phase encoder 300 or 132. When dealing with other groups of codes that make up the Hadamard code, the phase conjugate of the phase mask used in the spectral phase encoder may be utilized. Using any combination of coders, the spectral phase decoder 500 may reproduce the phase conjugate of all of the N Hadamard codes in order to decode the encoded data stream.

FIG. 6 shows an example of such an decoder. As shown in FIG. 6, decoder 500 includes a cascade of switches 501, 502, 503, and 504 and coders 511, 512, 513, and 514. coders 511, 512, 513, and 514 of decoder 500 are phase conjugates of coders 311, 312, 313, and 314 in encoder 300. Each switch is a 2×2 optical crossbar switch that routes or directs a signal into one or more of the coders to encode a signal with a particular Hadamard code. Switch 501 can be set so that an incoming signal can bypass coder 511 or pass through coder 511. Switch 502 can be set so that an incoming signal can bypass coder 512 or pass through coder 512. Switch 503 can be set so that an incoming signal can bypass coder 513 or pass through coder 513. Switch 504 can be set so that an incoming signal can bypass coder 514 or pass through coder 514. As such, switches 501, 502, 503, and 504 are used to direct the signal to either bypass their respective coders or to pass through their respective coders thereby decoding the signal. At the rightmost edge of the cascade, element 505 may be a passive coupler (which introduces an additional 3 dB loss) or an additional crossbar switch which may reduce the signal loss by connecting the output port to the active branch of the previous state; in short, the state of the rightmost switch (element 505) would match the state of the switch 504.

To approach the notion of Hadamard code grouping, using Walsh codes as an example, it is helpful to introduce a simpler notation for the Walsh product representation. Specifically, for N=32, the code $H_{12}$ can be written:

$$H_{12} = \underline{W}_{16} W_8 \underline{W}_4 W_2 W_1 = W_8 W_2 W_1$$

where the underlined Walsh terms are understood to be absent from the product and element-by-element product of the Walsh terms is implicit as is the "all 1's" code ($W_0$ or $H_1$) which is implicitly included in the above expression. In general, the set of N Hadamard codes are represented in terms of the presence or absence of the $\log_2(N)$ different Walsh terms. From this viewpoint, the XOR operations take the form of adding or dropping terms in the overall product according to simple rules for the addition or deletion of a Walsh term such as:

$$W_a W_a = \underline{W}_a \underline{W}_a = 1 \tag{1a}$$

$$W_a \underline{W}_a = \underline{W}_a W_a = W_a \tag{1b}$$

Using the above notation, groups of Hadamard codes can be identified. In general, any combination of Walsh terms can be selected and used as a code group label. The remaining combinations of Walsh terms can then be thought of identifiers for the members of each group. As an example, consider the code group $W_1, W_2, W_4, W_8, W_{16} \ldots W_N$. Although any number of Walsh terms may be used, in this example, the first two Walsh terms, $W_1$ and $W_2$, are chosen as the labels for the code groups.

Therefore, there are four different code labels and four different code groups. ($W_1 W_2, W_1\underline{W}_2, \underline{W}_1 W_2, \underline{W}_1\underline{W}_2$). Thus, all those codes that include both $W_1$ and $W_2$ terms are in the $W_1 W_2$ group; codes that include $W_1$ but not $W_2$ terms are in the $W_1\underline{W}_2$ group; codes that do not include $W_1$ but include $W_2$ terms are in the $\underline{W}_1 W_2$ group; and codes that do not include $W_1$ or $W_2$ are in the $\underline{W}_1\underline{W}_2$ group.

The remaining Walsh terms serve as group member identifiers. That is, these terms differentiate the members of the groups. So, for the example of N=32 and selecting two Walsh terms as the group label, we arrive at a maximum of four groups with up to 8 codes each. The choice of which Walsh terms to use as labels is entirely arbitrary at this point, that is, any pair of Walsh terms would seem to be as good as any other pair as group labels.

Figure 7:
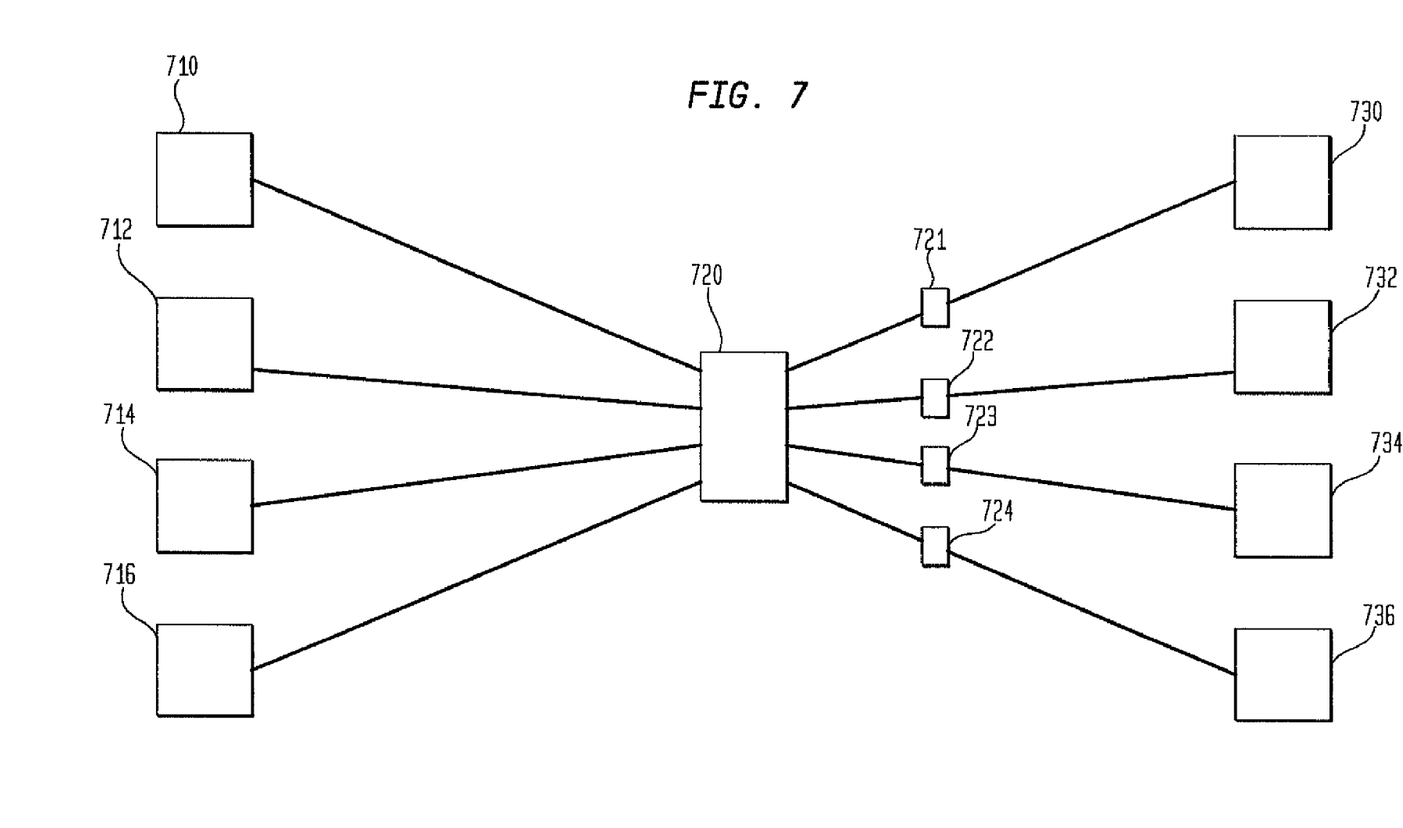
FIG. 7 illustratively depicts an optical network in accordance with an aspect of the invention.

An optical broadcast-and-select network in accordance with an aspect of the invention is depicted in FIG. 7. Each of the encoder groups 710, 712, 714, and 716 represents a different subset of spectral phase encoders 300 that is grouped according to their code label. Such encoder groups may be located in a transmitting station 170 as shown in FIG. 2. For N=32, up to 8 codes could be in each group identified by a label size of 2. For instance, encoder group 710 would have 8 spectral phase encoders that encode signals with $W_1$, $W_2$, and some combination of $W_4$, $W_8$, and $W_{16}$. The possible combinations are: $W_4$, $W_8$, $W_{16}$; $\underline{W}_4$, $W_8$, $W_{16}$; $\underline{W}_4$, $\underline{W}_8$, $W_{16}$; $\underline{W}_4$, $W_8$, $\underline{W}_{16}$; $\underline{W}_4$, $\underline{W}_8$, $\underline{W}_{16}$; $W_4$, $\underline{W}_8$, $W_{16}$; $W_4$, $\underline{W}_8$, $\underline{W}_{16}$; and $W_4$, $W_8$, $\underline{W}_{16}$. Encoder group 712 would have 8 spectral phase encoders that encode signals with $W_1$, $\underline{W}_2$, and some combination of $W_4$, $W_8$, and $W_{16}$. The possible combinations are: $W_4$, $W_8$, $W_{16}$; $\underline{W}_4$, $W_8$, $W_{16}$; $\underline{W}_4$, $\underline{W}_8$, $W_{16}$; $\underline{W}_4$, $W_8$, $\underline{W}_{16}$; $\underline{W}_4$, $\underline{W}_8$, $\underline{W}_{16}$; $W_4$, $\underline{W}_8$, $W_{16}$; $W_4$, $\underline{W}_8$, $\underline{W}_{16}$; and $W_4$, $W_8$, $\underline{W}_{16}$. Encoder group 714 would have 8 spectral phase encoders that encode signals with $\underline{W}_1$, $W_2$, and some combination of $W_4$, $W_8$, and $W_{16}$. The possible combinations are: $W_4$, $W_8$, $W_{16}$; $\underline{W}_4$, $W_8$, $W_{16}$; $\underline{W}_4$, $\underline{W}_8$, $W_{16}$; $\underline{W}_4$, $W_8$, $\underline{W}_{16}$; $\underline{W}_4$, $\underline{W}_8$, $\underline{W}_{16}$; $W_4$, $\underline{W}_8$, $W_{16}$; $W_4$, $\underline{W}_8$, $\underline{W}_{16}$; and $W_4$, $W_8$, $\underline{W}_{16}$. Encoder group 716 would have 8 spectral phase encoders that encode signals with $\underline{W}_1$, $\underline{W}_2$, and some combination of $W_4$, $W_8$, and $W_{16}$. The possible combinations are: $W_4$, $W_8$, $W_{16}$; $\underline{W}_4$, $W_8$, $W_{16}$; $\underline{W}_4$, $\underline{W}_8$, $W_{16}$; $\underline{W}_4$, $W_8$, $\underline{W}_{16}$; $\underline{W}_4$, $\underline{W}_8$, $\underline{W}_{16}$; $W_4$, $\underline{W}_8$, $W_{16}$; $W_4$, $\underline{W}_8$, $\underline{W}_{16}$; and $W_4$, $W_8$, $\underline{W}_{16}$.

The encoded signals are sent to a star coupler 720. The star coupler 720 is passive optical coupler having a number of input and output ports. An optical signal introduced into any input port is distributed to all output ports. Because of the nature of the construction of a passive star coupler, the number of ports is usually a power of 2. The outbound legs of the star coupler connect to matching groupings of decoders 730, 732, 734, and 736. Decoder group 730 decodes signals corresponding to the group $W_1$ $W_2$. Decoder group 732 decodes signals corresponding to the group $W_1$ $\underline{W}_2$. Decoder group 734 decodes signals corresponding to the group $\underline{W}_1$ $W_2$. Decoder group 736 decodes signals corresponding to the group $\underline{W}_1$ $\underline{W}_2$.

Variable coders 721, 722, 723, and 724 are positioned on the outbound legs of the star coupler. Each variable coder is adjustable to any of the four label states of decoders 730, 732, 734, and 736. Such decoders may be located in a receiving station 180 as shown in FIG. 2. The variable coders can, in effect, re-label any of the four incoming code groups so that it is compatible with its associated decoder group as will be described below with regard to FIG. 9. At the same time, this re-labeling changes any of the other incoming code groups to a form mismatched to that same decoder group. The re-labeling proceeds according to the rules outlined in equations (1a, b). The variable coders affect only the code label and not the group member identifier portions of the codes. More than one decoder group can detect signals from one encoder group (multicasting).

Although FIG. 7 depicts the variable coders positioned near the star coupler 720 at the center of the network, these coders could equivalently be positioned near the edges of the network. A centralized location puts control of the routing function in the hands of a centralized management system and thereby might prevent unwanted eavesdropping on some signal groups. Edge placement de-centralizes the control of the routing function but opens the doors to possibly unwanted eavesdropping. Likewise, the variable coders used for routing/re-labeling could be placed on the inbound fibers on the other side of the star coupler.

Figure 8:
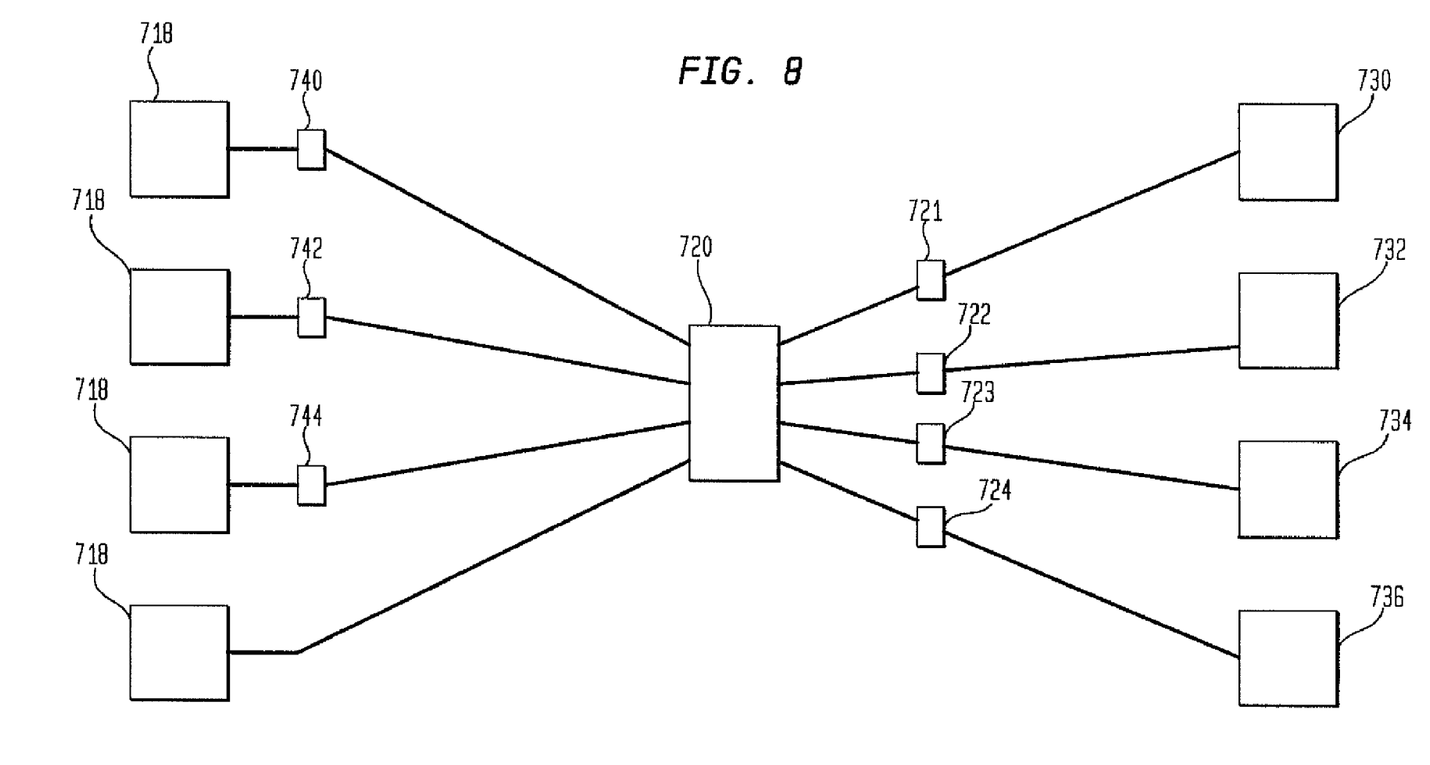
FIG. 8 illustratively depicts an optical network in accordance with an aspect of the invention.

As was pointed out earlier, in the network configuration in FIG. 7, the encoder and decoder groups on the left and right, respectively are associated with a uniquely different subset of the N Hadamard codes. However, as shown in FIG. 8, it is possible to physically separate the code labeling functions from the assembly of the code group. In each of the four encoder groups 718, an identical set of coders can be used. This set consists of all those codes which include none of the Walsh terms used in the group label-in short, those codes using some combination of the group member identifier set of Walsh codes. For the specific labeling choice described above, such group member identifiers may be one of the following: $W_4$, $W_8$, $W_{16}$; $\underline{W}_4$, $W_8$, $W_{16}$; $\underline{W}_4$, $\underline{W}_8$, $W_{16}$; $\underline{W}_4$, $W_8$, $\underline{W}_{16}$; $\underline{W}_4$, $\underline{W}_8$, $\underline{W}_{16}$; $W_4$, $\underline{W}_8$, $W_{16}$; $W_4$, $\underline{W}_8$, $\underline{W}_{16}$; and $W_4$, $W_8$, $\underline{W}_{16}$ for N=32. Once this set of codes is assembled, all of the codes can be simultaneously and passively "labeled" by passing them through one of the three "labeling" coders 740, 742, and 744. Coder 740 would label signals with $W_1$, $W_2$, coder 742 would label signals with $W_1$, $\underline{W}_2$, and coder 744 would label signals with $\underline{W}_1$, $W_2$.

In FIG. 8, the labeling coders 740, 742, and 744 are variable coders whose operation will be described below with regard to FIG. 9. Alternatively, labeling coders may also be fixed coders.

Figure 9:
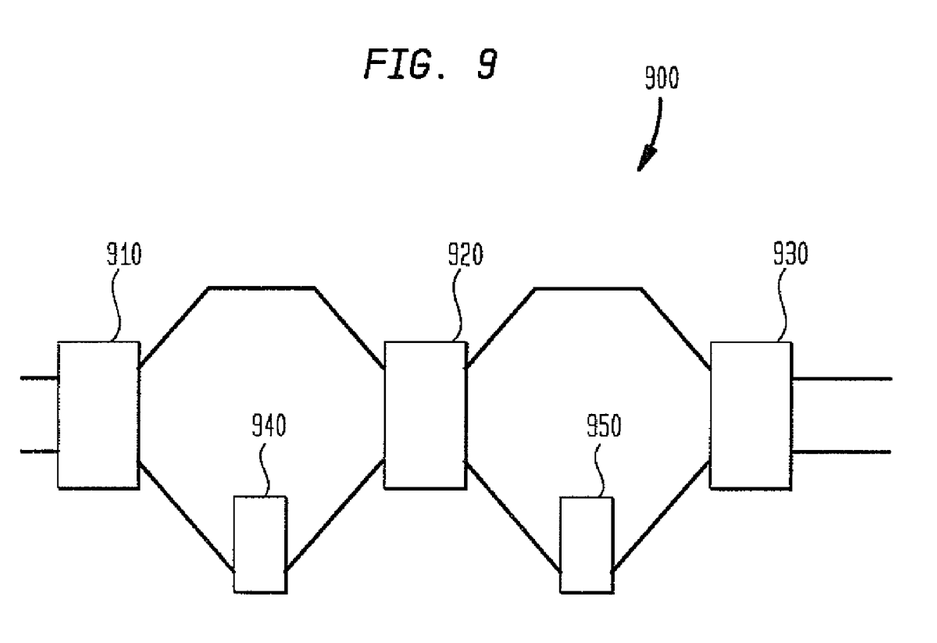
FIG. 9 illustratively depicts a variable coder in accordance with an aspect of the invention.

FIG. 9 depicts a variable coder 900 in accordance with an aspect of the invention. Variable coder 900 includes three 2×2 crossbar switches 910, 920, and 930. Coupled between crossbar switches 910 and 920 is a coder 940. Coupled between crossbar switches 920 and 930 is a coder 950. Coders 940 and 950 may be similar to the coder depicted in FIG. 4. As an example, for groups that are labeled using Walsh codes $W_1$ and $W_2$. Coder 940 may a $W_1$ coder and coder 950 may be a $W_2$ coder. The operation of variable coder 900 will be explained using the optical network of FIG. 7 as an example.

In FIG. 7, if a signal emanating from element 710, which encodes signals with a $W_1$ $W_2$ label is transmitted and its desired destination is element 736 which receives signals with a $\underline{W}_1$ $\underline{W}_2$ label, the signal passes through star coupler 720 to variable encoder 724. Variable encoder 724 or 900 sets crossbar switches 910 and 920 so that the signal passes through coders 940 and 950. In accordance with the rules outlined in equations 1a and 1b, the label $W_1$ $W_2$ is removed when passing through coders 940 and 950.

As another example, if a signal emanating from element 716, which encodes signals with a $\underline{W}_1$ $\underline{W}_2$ label is transmitted and its desired destination is element 730 which receives signals with a $W_1$ $W_2$ label, the signal passes through star coupler 720 to variable encoder 721. Variable encoder 721 or 900 sets crossbar switches 910 and 920 so that the signal passes through coders 940 and 950. In accordance with the rules outlined in equations 1a and 1b, the label $W_1$ $W_2$ is added when passing through coders 940 and 950.

If, however, the desired destination for a signal emanating from element 710 was element 734, which receives signals with the label $\underline{W}_1$ $W_2$, switch 910 would be set so that the signal passes through coder 940 ($W_1$ $W_1$=1; thereby removing the label $W_1$) and switch 920 is set so that signal bypasses coder 950. As such, any incoming signal could be relabeled using the rules outlined in equations 1a and 1b, so that they may be received at the appropriate destination.

Although variable coder 900 was described using two coders 940 and 950, any number of coders may be used depending on the label size. For instance if the label size was three, then three coders may be used in coder 900. If the label size was four then four coders may be used in variable coder 900. Alternatively, each coder (940 and 950) may be constructed with multiple codes. For instance coder 940 may include a $W_1$ $W_2$ coder and coder 950 may include $W_1$ $W_4$ coder. The combination of such coders may be used to generate Hadamard codes $H_1$, $H_4$, $H_6$, and $H_7$ that may be used to label signals.

One of the reasons for interest in OCDMA is that it may provide physical-layer obscurity for high-bandwidth signals. Recent analysis of the eavesdropping protection provided by SPE and other types of OCDMA point out that such systems are most vulnerable to eavesdropping when only a single code is present on a link (as would typically be case on the inbound links to a central star coupler). However, one can envision a network scenario consisting of multiple secure islands within which Hadamard coding would be used for signal routing/addressing purposes, but before these signal groups exit the secure islands they would be scrambled by passing through a shared randomly-chosen scrambling stage. Specifically, we must assume that the groups of codes leaving the secure island are always sent simultaneously, as would be the case if large bandwidth signals were being sent on several codes in parallel by inverse multiplexing.

We describe a novel optical networking concept enabling the routing of groups of SPE OCDMA Hadamard-coded signals. The foundation of code grouping is the set of functions which form a multiplicative basis underlying the Hadamard codes. In the above description, Walsh codes were used as an example to illustrate the foundation for code grouping although any spanning group of Hadamard codes would also suffice for this purpose. We have described how this code-grouping concept permits groups of SPE Hadamard codes to be passively "labeled" and routed as groups on the basis of those labels. Furthermore, it possible to physically separate the code labeling functions from the assembly of the code group and thereby use identical sets of coders within each group.

The ability to deal with groups of codes has important implications for the overall signal obscurity provided by OCDMA. In large measure, OCDMA signal obscurity rests on codes obscuring one another. If several lower-data-rates codes are used to transmit one larger data rate signal (via inverse multiplexing), signal obscurity is enhanced at the physical layer because the group of codes forms a mutually self-obscuring set. Thus, the ability to perform "group routing" is a natural complement to use of inverse multiplexing to form a self-obscuring signal and would be particularly advantageous in these scenarios.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed:

1. An-optical network comprising:
   a transmitting station operable to transmit an optical signal having a group of coded optical signals;
   an encoder coupled to the transmitting station operable to label the optical signal having the group of coded optical signals;
   a receiving station operable to receive the labeled optical signal, the receiving station is operable to read the labeled optical signal if the code used to label the group of codes corresponds to the label associated with the receiving station; and
   a variable coder coupled between the encoder and the receiving station, the variable coder is operable to re-label the incoming optical signal having a group of codes with a new group of codes corresponding to the receiving station,
   wherein the variable coder further comprises a cascaded plurality of Walsh-Hadamard coders.

2. An-optical network comprising:
   a transmitting station operable to transmit an optical signal having a group of coded optical signals;
   an encoder coupled to the transmitting station operable to label the optical signal having the group of coded optical signals;
   a receiving station operable to receive the labeled optical signal, the receiving station is operable to read the labeled optical signal if the code used to label the group of codes corresponds to the label associated with the receiving station; and
   a variable coder coupled between the encoder and the receiving station, the variable coder is operable to re-label the incoming optical signal having a group of codes with a new group of codes corresponding to the receiving station,
   wherein the variable coder comprises:
   a plurality of switches; and
   at least one Walsh encoder coupled between a first switch and second switch of the plurality of switches, the first switch being operable to selectively route an optical signal to the Walsh encoder to apply a Hadamard sequence to the optical signal.

3. The optical network according to claim 2, each switch among the plurality of switches a 2×2 crossbar switch.

4. The optical network according to claim 2, wherein the variable coder further comprises a third switch.

5. The optical network according to claim 4, wherein the variable coder further comprises at least one Walsh encoder coupled between the second switch and the third switch.

* * * * *